Dec. 31, 1963  G. R. CRANE  3,115,759
FLEXIBLE COUPLINGS
Filed Oct. 25, 1961  2 Sheets-Sheet 1

INVENTOR

BY Watson Leavenworth & Kelton
ATTORNEY

Dec. 31, 1963 G. R. CRANE 3,115,759
FLEXIBLE COUPLINGS
Filed Oct. 25, 1961 2 Sheets-Sheet 2

INVENTOR

BY
Watson Leavenworth & Kelton
ATTORNEY 3,115,759
FLEXIBLE COUPLINGS
Gordon Robert Crane, Sheffield, England, assignor to Laycock Engineering Limited, Sheffield, England
Filed Oct. 25, 1961, Ser. No. 147,601
Claims priority, application Great Britain Oct. 28, 1960
8 Claims. (Cl. 64—11)

This invention relates to flexible couplings of the type comprising a ring of connecting members, commonly four or six, alternately arranged for connection to driving and driven members and supported within bushes of rubber or like material housed in a supporting structure with axes parallel to the rotational axis of the coupling.

Couplings of the above type normally have each connecting member supported within a single bush, and when the coupling has to accommodate only moderate angularity of the drive between driving and driven members the bush is subject of tensile stress which increases from the center of the bush towards the axial ends of the latter. It is normal practice to mould each bush around a wire mesh screen which reinforces the bore of the bush, and present forms of couplings have been found to fail due to failure of the bonding between the bush and the mesh screen as a result of tensile stresses in the region of bonding.

According to one feature of the invention a coupling of the type set forth has each connecting member supported by a pair of aligned bushes arranged back to back in the axial sense, the free form of the bushes being such that with their adjacent outer peripheries in contact a spacing is left between their inner peripheries, the bushes being pre-stressed during assembly of the coupling so that this spacing is reduced.

Preferably the bushes of each pair are mounted in the corresponding housing with their outer peripheries in contact and the spacing between the inner peripheries completely taken up on assembly, and the connecting members are conveniently an interference fit within the bores of the bushes so that when positioned therein the interference retains the bushes in the final assembled relationship. The pre-stressing resulting from the distortion of the bushes during assembly provides a degree of compression of the rubber of each bush adjacent the axially outer end of the latter at its region of bonding to the mesh reinforcement, when such reinforcement is used, so that a greater angularity of drive can be transmitted without this region of bonding being subject to a tensile stress; this reduces in a marked degree the danger of premature failing of the bonding.

Each connecting member is preferably in the form of a sleeve arranged to receive a connecting bolt attaching the sleeve to the driving or driven member, and the interference fit of the sleeve within the bushes is preferably sufficient to maintain the latter in shear. As usual, the fitting of the bushes in the housings of the supporting structure preferably produces radial compression of the bushes.

With conventional couplings of the type in question, having each connecting member supported within a single bush, the movement of the connecting members relatively to the outer peripheries of the bushes is limited in the axial, angular and radial directions before the compression of the rubber is relieved. Further relative movement sets up tensile stresses which rapidly lead to failure of the bushes. As each pair of bushes of the present invention is preferably compressed in the radial direction as well as in the axial direction, a coupling in accordance with the invention is capable of accommodating not only greater angularity and the accompanying "plunge" but also greater radial movement; hence, the coupling has a correspondingly greater torque carrying capacity. It will be clear that, instead of designing such a coupling for greater torque capacity, the larger permissible movement of each coupling member or sleeve relatively to the outer periphery of each associated bush can be used to obtain a coupling of increased flexibility; this is achieved by suitably adjusting the rubber dimensions of the bush and the rubber hardness.

Tests have shown that the axial stiffness of a coupling in accordance with the invention is only about half that of a conventional coupling of the same type of comparable dimensions. This is due to the fact that when each pair of bushes is subjected to an axial load the stresses in one bush of the pair are relieved as the stresses in the other are increased. The main practical advantage of this is that the coupling offers less resistance to axial plunge, thus allowing it to accommodate greater angular movement. In addition, when such a coupling is used in the propeller shaft of the transmission of a motor vehicle, the greatly reduced axial stiffness of the coupling results in a material reduction in the axial load on the bearings supporting the propeller shaft.

According to another feature of the invention a bush of rubber or like material for a coupling of the type set forth is moulded with a central reinforcing core of wire mesh or the like to which it is bonded, at one end the inner periphery of the bush being set in in the axial sense relatively to the outer periphery.

Preferably the bush is of asymmetric form in an axial plane of the bush, and conveniently the inner and outer peripheries are of equal axial length.

The bush is preferably moulded in natural rubber, but other suitable resilient materials may be used. For example, a high strength relatively hard synthetic rubber such as polyurethane rubber could be used.

The invention will now be further described with reference to the accompanying drawings which illustrate, by way of example, two forms of flexible coupling in accordance with the invention, and in which.

Figure 1:
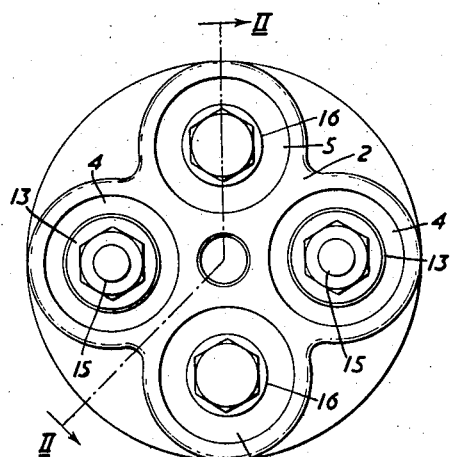
FIGURE 1 is an end view of one of the couplings.
Figure 2:
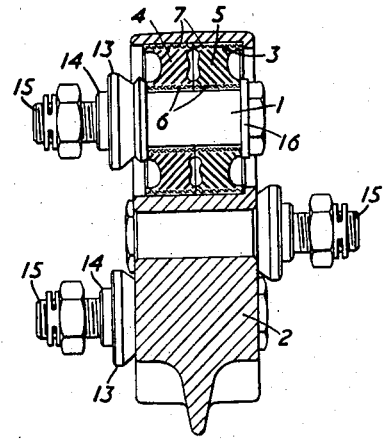
FIGURE 2 is a sectional view on the line II—II in FIGURE 1.

The flexible coupling of FIGURES 1 and 2 has a ring of four equiangularly spaced connecting members 1. The coupling has a one-piece supporting structure 2 formed with four cylindrical housings 3 within which rubber bushes are mounted, a pair of bushes such as 4 and 5 being mounted back to back in the axial sense within each housing 3. The supporting structure 2 is formed to provide an inturned lip at one end of each housing 3 to locate the corresponding bushes in position therein.

Figure 4:
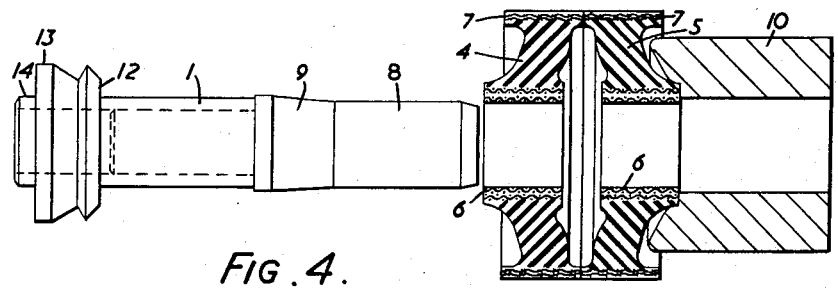
FIGURE 4 illustrates a sub-assembly operation of both forms of coupling.

The bushes 4 and 5 have central bores reinforced in the usual manner by a wire mesh screen 6 around which the bushes are moulded, the outer peripheries of the bushes having a canvas reinforcement at 7. In contrast to the usual arrangement, however, the bushes 4 and 5 are moulded with a free asymmetric form (as shown in FIGURE 4) so that their inner and outer peripheries although of equal axial length are relatively displaced in the axial direction. Each pair of bushes is arranged so that in the free form as shown in that figure, with the outer peripheries in contact the inner peripheries are spaced by an amount depending upon the asymmetric form of the bushes 4 and 5.

Figure 5:
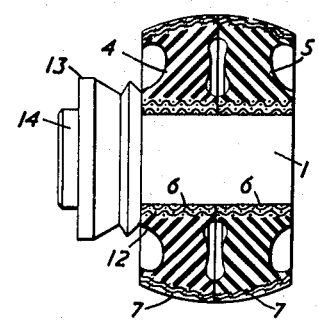
FIGURE 5 shows the completed sub-assembly.

Each connecting member 1 is a steel sleeve which is an interference fit within the bores of the corresponding pair of bushes 4 and 5 and is initially fitted therein, in the sub-assembly operation of FIGURE 4, utilising a mandrel 8 with a tapered section 9 providing a lead. The pair of bushes 4 and 5 is forced along this mandrel 8 into position on the connecting member 1, against a fixed reaction sleeve 10, until the inner peripheries of the two bushes 4 and 5 are in contact, this positional relationship being retained by the interference fit as shown in FIGURE 5. Adjacent one end the connecting member is formed with a shoulder 12 against which the adjacent bush 4 is located, and this end is formed with a flange 13 and spigot 14 for location in a driving or driven member (not illustrated) to which the connecting member 1 is attached by a bolt 15 (FIGURES 1 and 2) passing through the connecting member 1. At its other end the member 1 terminates flush with the outer axial end of the bush, and a washer 16 and the head of the corresponding bolt 15 positively retains the bushes 4 and 5 on the connecting member 1.

The connecting members 1 alternately project on opposite sides of the coupling for attachment to driving and driven members respectively disposed on such opposite sides.

After each pair of bushes 4 and 5 has been assembled on the corresponding connecting member 1 the sub-assembly of FIGURE 5 is fitted in one of the housings 3 of the supporting structure 2. The bushes 4 and 5 are pressed into their housings 3 to produce a general radial pre-compression of the bushes.

Figure 3:
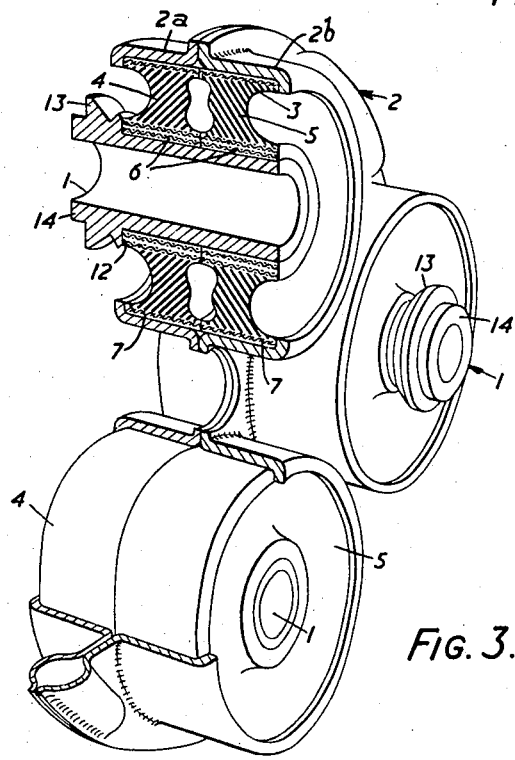
FIGURE 3 is a perspective view of the other coupling, partly in section.

The coupling of FIGURE 3 is generally similar to that of FIGURES 1 and 2, the main difference being that the supporting structure 2 is formed by two similar steel pressings 2a and 2b which, when assembled, form the cylindrical housings 3 for the pairs of bushes 4 and 5. Each pressing 2a or 2b is formed to provide an inturned lip at the corresponding end of each housing 3 to assist in retaining the bushes in position therein. During assembly of this coupling, each of the sub-assemblies as illustrated in FIGURE 5 is fitted in one of the pressings 2a or 2b, the attachment of tht other pressing 2b or 2a then completing the assembly of the supporting structure 2 with the bushes 4 and 5 and the connecting members 1 in position.

The interference fit of the connecting member 1 within the bushes 4 and 5 with each coupling is sufficient to retain the rubber of the bushes in shear, and the distortion of the bushes 4 and 5 during the sub-assembly on the connecting members 1 pre-compresses the axially outer ends of the bushes in the region of bonding to the mesh reinforcement 6 so that the coupling can sustain a considerably greater angularity than has hitherto been the case, without this region being subject to tensile stresses likely to cause the bonding to fail prematurely.

Figure 6:
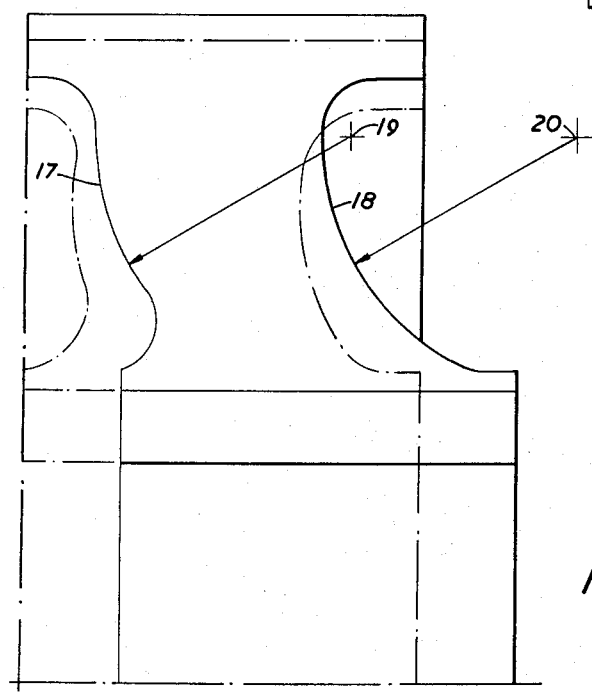
FIGURE 6 is a detail large-scale fragmentary view of a component bush of both forms of coupling.

FIGURE 6 is a half axial section of one of the similar bushes 4 and 5. The free form of the bush is shown in full lines in this figure, the final assembled shape of the bush when fitted in the corresponding housing 3 being as shown in broken lines in the same figure. As shown, the axial ends 17 and 18 of the bush in the natural mould position represent parallel arcs in axial cross-section. These arcs are respectively struck about centres 19 and 20 which, for a particular section, are aligned in the axial direction of the bush. The asymmetric shape of the bush when fitted clearly shows the radial and axial pre-compression of the bush which results from assembly.

Although both the described coupling utilise cylindrical housings 3 for the bushes 4 and 5, FIGURE 5 shows the distorted barrel-shaped outer periphery of the sub-assembly of that figure. In a modified arrangement,, which is not illustrated in the drawings, the pressings 2a and 2b of the supporting structure 2 of the coupling shown in FIGURE 3 are formed with generally part-spherical pockets defining the bush housings. Thus each housing generally corresponds in shape to the barrel shape of FIGURE 5, the dimensions of the pockets being chosen to provide the desired radial compression of the bushes 4 and 5 on final assembly.

I claim:

1. A flexible coupling comprising a supporting structure formed with a ring of spaced housings, a ring of connecting members adapted for connection alternately to driving and driven members and each positioned centrally within a corresponding one of said housing parallel to the rotational axis of the coupling, and in each housing a pair of aligned bushes of rubber-like material arranged back to back in the axial sense and supporting the corresponding connecting member in that housing, the bushes having a substantially cylindrical inner periphery and the free form of each pair of bushes being such that with the adjacent outer peripheries in contact a spacing is left between the inner peripheries, the bushes being pre-stressed during assembly of the coupling so that when assembled such inner spacing is reduced.

2. A flexible coupling according to claim 1, wherein the bushes of each pair are mounted in the corresponding housing with the outer peripheries of the bushes in contact.

3. A flexible coupling according to claim 2, wherein the spacing between the inner peripheries of each pair of bushes is completely taken up on assembly.

4. A flexible coupling according to claim 1, wherein fitting of the bushes in the housings of the supporting structure produces radial compression of the bushes.

5. A flexible coupling comprising a supporting structure formed with a ring of spaced housings, a ring of connecting members adapted for connection alternately to driving and driven members and each positioned centrally within a corresponding one of said housings parallel to the rotational axis of the coupling, and in each housing a pair of aligned bushes of rubber-like material arranged back to back in the axial sense and supporting the corresponding connecting member in that housing, the bushes having a substantially cylindrical inner periphery which is an interference fit on the connecting members and the free form of each pair of bushes being such that with the adjacent outer peripheries in contact a spacing is left between the inner peripheries, the bushes being pre-stressed during assembly of the coupling so that when assembled such inner spacing is reduced.

6. A flexible coupling according to claim 5, wherein the interference fit of the connecting members is sufficient to maintain the bushes in shear.

7. A flexible coupling according to claim 5, wherein each connecting member has a shoulder for location of one bush of the corresponding pair of bushes and the member terminates flush with the remote end of the other bush of the pair.

8. A flexible coupling comprising a supporting structure formed with a ring of spaced housings, a ring of sleeve-like connecting members each positioned centrally within a corresponding one of said housings parallel to the rotational axis of the coupling, a pair of aligned bushes of rubber-like material arranged back to back in the axial sense in each housing and supporting the corresponding member in that housing, the bushes having a substantially cylindrical inner periphery and the free form of each pair of bushes being such that with the adjacent outer peripheries in contact a spacing is left between the inner peripheries, the bushes being pre-stressed during assembly of the coupling so that when assembled such inner spacing is reduced, and connecting bolts passing through each connecting member for connection of the latter alternately to driving and driven members to be coupled by the coupling.

References Cited in the file of this patent

UNITED STATES PATENTS

| | | |
|---|---|---|
| 2,628,416 | Sampson | Feb. 17, 1953 |
| 2,852,286 | Guy et al. | Sept. 16, 1958 |

FOREIGN PATENTS

| | | |
|---|---|---|
| 1,021,213 | Germany | Dec. 19, 1957 |
| 848,899 | Great Britain | Sept. 21, 1960 |